United States Patent [19]
Bauer et al.

[11] 3,947,006
[45] Mar. 30, 1976

[54] GAS SPRING, PISTON LOCKING

[76] Inventors: Hans-Peter Bauer, Ziegelhutte 9, 8503 Altdorf; Hans Jurgen Bauer, am Eichenhain 8, 8505 Rothenbach, both of Germany

[22] Filed: Dec. 20, 1974

[21] Appl. No.: 535,132

[52] U.S. Cl............. 267/120; 188/196 P; 160/188; 296/56
[51] Int. Cl.²......................................... F16F 5/00
[58] Field of Search.......... 267/120, 65 R; 160/188, 160/191, 192, 189; 296/56; 188/79 GE, 196 P

[56] References Cited
UNITED STATES PATENTS

| | | | |
|---|---|---|---|
| 2,814,366 | 11/1957 | Lucien | 188/196 P |
| 3,698,464 | 10/1972 | Scheitel | 160/188 |
| 3,851,867 | 12/1974 | Fricko | 267/120 |

Primary Examiner—James B. Marbert
Attorney, Agent, or Firm—Browdy and Neimark

[57] ABSTRACT

A gas spring for maintaining motor vehicle trunk lids or hatchbacks open, comprises a gas spring piston having a circumferential groove for retaining therewithin a snap ring, and a cooperative annular recessed groove in the internal wall of the cylinder housing located at a position of maximum movement of the piston rod from the cylinder so that in such position the piston is locked in place.

5 Claims, 4 Drawing Figures

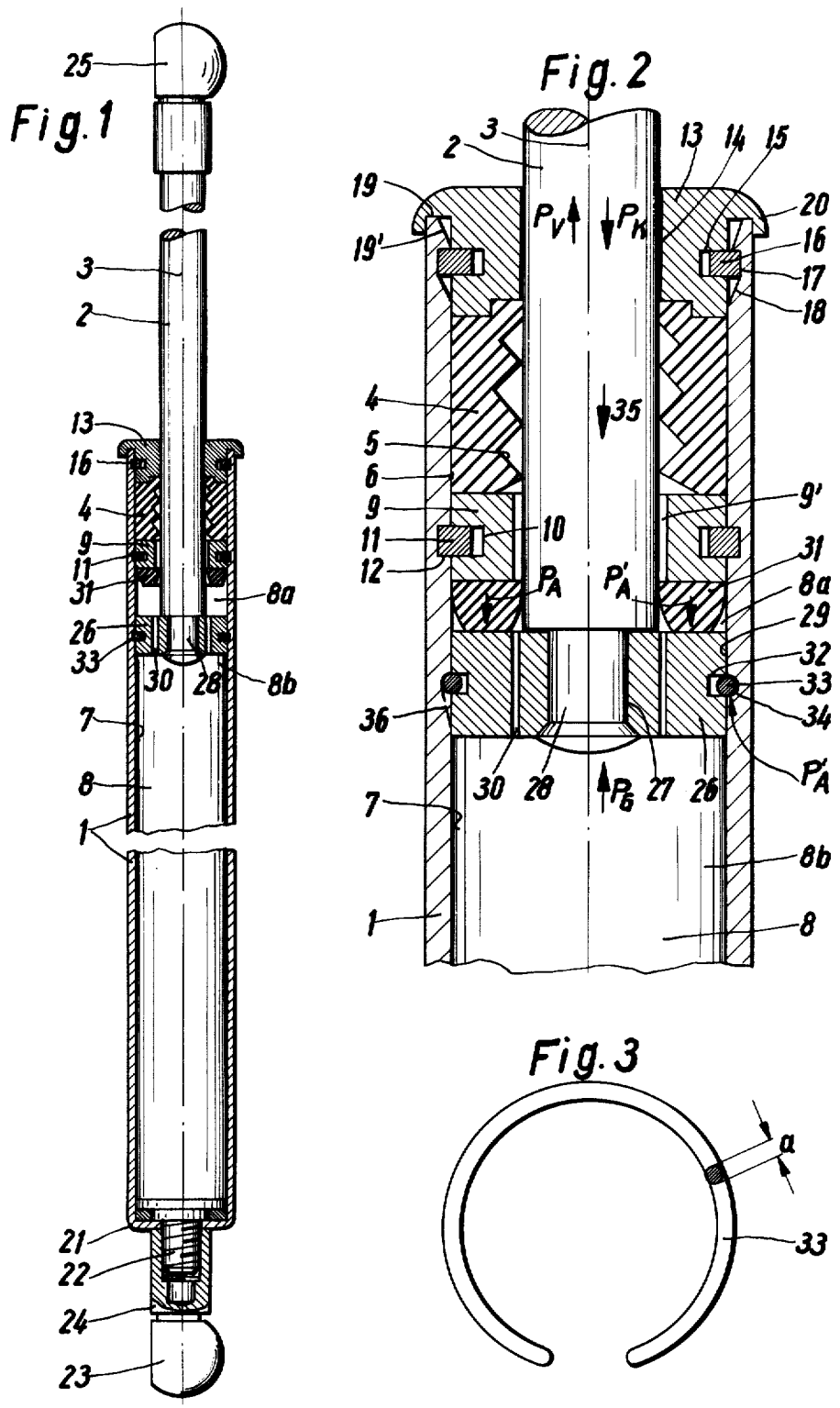

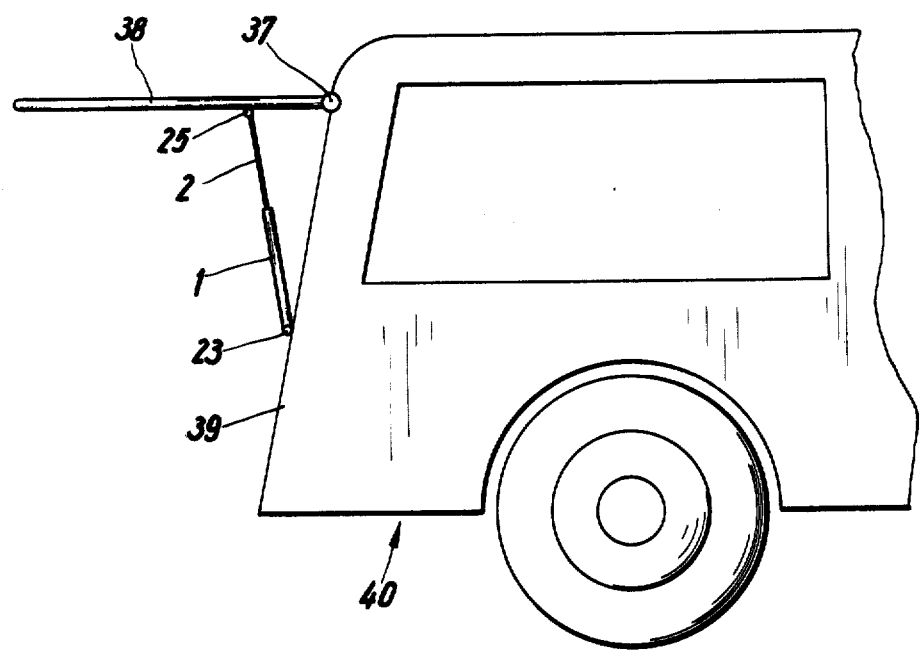

GAS SPRING, PISTON LOCKING

FIELD OF THE INVENTION

The invention relates to gas springs and, more particularly, such devices consisting of a housing formed by a cylindrical tube and a piston rod operating as a compressing cylinder mounted coaxially in the housing, the piston rod supporting a guide piston and protruding from one end of the housing, with a seal mounted axially in the housing against the piston rod at the end of the housing at which the piston rod emerges, and with an elastically yielding shock absorber for the guide piston being provided in the vicinity of the internal end face of the seal.

BACKGROUND OF THE INVENTION

Such gas springs are widely used, among other uses, as lifting devices for hatchbacks or trunk lids of motor vehicles. Usually the dimensioning and installation of the gas springs is such that their outward-pushing force is exactly sufficient to raise the trunk lid or hatchback to the uppermost open position, so that a correspondingly oppositely directed force must be applied to close the hatchback or trunk lid.

The following problems can arise in this connection. If a vehicle is to be operated with the hatchback in the open position, for example, with objects being transported protruding out of the cargo space, or if the vehicle is to be operated only for short stretches between individual loading and unloading procedures, the hatchback will vibrate in its uppermost raised position, since it is supported by a spring. Gas springs are filled with compressed gas at a room temperature of approximately 20° C. When the outside temperature falls, the gas pressure in the gas spring decreases, so that at relatively very low ambient temperatures this can result in the outward-pushing force of the spring no longer being sufficient to raise the hatchback or the trunk lid and, what is still more important, to keep such hatchback or lid in its uppermost open position. For example, it should be pointed out that the gas pressure in the gas springs filled at +20° C decreases about 20 percent at a temperature of −40° C.

Finally, a gas spring may have slight leaks in it, so that until the gas spring is replaced by a new one, the hatchback or trunk lid will not stay in its uppermost position. In order to avoid these problems, supporting hinges are often provided between the fixed and swinging parts of the hatchback or trunk lid, to supplement the gas spring, the supporting hinges holding the swinging part in the raised position and allowing it to swing down again only when a rigidly interlocking latch on the two arms of such a hinge is released.

SUMMARY OF THE INVENTION

It is, accordingly, an object of the invention to overcome defects in the prior art, such as indicated above.

It is another object to provide for improved gas springs.

It is a further object to eliminate the need for supplementary supporting hinges for hatchback or trunk lids in motor vehicles.

Yet another object of the invention is to create a gas spring of the type described hereinabove, especially for use as a lifting device for a part which is to swing relative to another part, in such fashion that a releasable locking of the gas spring is possible with the piston rod protruding from the housing.

These objects are achieved according to the invention by mounting a snap ring in an annular groove on the outside circumferential area of the guide piston and providing an annular recessed groove in the internal wall of the housing to receive the snap ring when the guide piston is partially and releasably moved against the shock absorber.

The measure according to the invention solves the problem listed hereinabove in an extraordinarly simply and problem-free fashion. When the annular groove in the guide piston and the annular recessed groove in the internal wall of the housing are lined up, from an outward drawing of the piston rod and subsequent outward movement of the guide piston to its outermost position, the snap ring, because of its preset tension, interlocks with a portion of its cross section extending into both the annular recessed groove of the housing and the annular groove of the guide piston thereby locking together the housing and the guide piston. If a sufficiently great inward pushing force is exerted upon the piston rod and thereby upon the piston, the snap ring will be pushed back into the annular groove in the guide position and the lock will be released. The magnitude of the axial force required to release this axial lock is essentially dependent upon the spring characteristics of the snap ring, governed by the material and the cross section, and the shape of the annular recessed groove in the internal wall of the housing.

A particularly advantageous embodiment of the invention is obtained when the annular recessed groove is displaced axially relative to the position of the snap ring in the balanced end position of the guide piston by a short distance with respect to the seal, the shock absorber being compressible for at least this distance. In this embodiment according to the invention, therefore, the lock between the guide piston and the housing is not created when the piston is in its end position against the shock absorber, but only after an additional outwardly directed tensile force has been exerted upon the piston rod, additionally compressing the shock absorber. The lock therefore does not operate automatically when the piston rod is pulled out of the housing when the hatchback or trunk lid is raised, but only when the raised lid or raised hatchback has been purposefully lifted a short further distance. The dimensioning is such that this additional required force is very small, for example, less than 10 kp. The magnitude of the distance required for such a predetermined slight force to displace the annular recessed groove with respect to the balanced end position of the snap ring depends upon the spring characteristics of the shock absorber.

On the one hand, to have sufficiently high but not excessively high locking forces in order that the lock can be released without excessive manual force having to be expended, it is advantageous if the annular recessed groove in the housing is proveded at least on the side facing the internal chamber with a tapered surface which slopes from the groove toward the housing axis in such fashion that when a force is exerted in the inwardpushing direction of the piston rod, a radial force component will act upon the snap ring which tends to reduce its diameter, the radial force component being caused by movement of the snap ring along the taper.

It has been found to be particularly simple and advantageous for the snap ring to have a circular cross section. It is particularly advantageous if the depth of the annular recessed groove in the housing is less than half the diameter of the snap ring cross section.

BRIEF DESCRIPTION OF THE DRAWING

Further advantages and features of the invention will be seen from the description of a sample embodiment with reference to the drawing, wherein:

FIG. 1 is an embodiment of a gas spring according to the invention, in lengthwise section;

FIG. 2 is an enlarged representation of the piston of the gas spring of FIG. 1 in its extended end position;

FIG. 3 is a snap ring in top view; and

FIG. 4 is a gas spring installed between the hatchback and body of a motor vehicle according to the invention in a schematic representation.

DETAILED DESCRIPTION OF ILLUSTRATED EMBODIMENTS

The gas spring shown in the drawing consists essentially of a tubular or cylindrical housing 1, which is long with respect to its diameter, and is therefore slender; the housing is preferably made of a drawn steel tube. A piston rod 2, acting as a compressing piston, is mounted coaxially in housing 1, the piston rod also having a cylindrical cross section. The axis of the piston rod therefore coincides with the axis 3 of housing 1. The housing is sealed by means of a known multiple-lip seal 4 at the end (at the top of the drawing) from which the piston rod emerges from housing 1; the seal 4 has its lips 5 resting against the absolutely smooth surface of piston rod 2. The outer circumference 6 of lip seal 4 also effects a seal against the internal wall 7 of the housing 1, so that an absolutely tight closure of the housing 1 at the end from which the piston rod 2 emerges is achieved by this seal, which is of homogeneous construction and is therefore not protected.

At its end face, which rests against the internal chamber 8 of housing 1, the lip seal 4, whose length is approximately equal to its outside diameter, is fastened axially in place within the housing 1 by means of a cylindrical annular holding element 9. The diameter of bore 9' of the fastening element is somewhat larger than the diameter of piston rod 2, so that the rod 2 does not contact and is not guided in the fastening element 9. The fastening element 9 has a radially recessed annular groove shaped depression 10 on its outside circumference which is in contact with internal wall 7 of the housing 1; a snap ring 11, i.e., an elastically deformable ring, is associated with and rests within the depression 10. The internal wall 7 of the housing 1 is provided with a corresponding annular groove, likewise recessed radially, into which snap ring 11 also fits.

The axial lengths of recess 10 and annular groove 12 are the same and of such size that snap ring 11 has practically no axial play when located within the recess 10 and the annular groove 12, so that the fastening element 9 is held in housing 1 with absolutely no axial play. The radial depth of the annular recess 10 is at least as great as the radial width of snap ring 11, so that the snap ring can elastically deform and retreat completely into the recess 10 when the fastening element 9 is shoved into housing 1; then, when the recess 10 and the annular groove 12 line up radially, the ring 11 snaps into the annular groove 12 under elastic expansion, thus producing a permanent connection between the fastening element 9 and the housing 1 at this point.

In the illustrative embodiment shown in FIGS. 1 and 2, the seal 4 is fastened axially at its outer end face by a similar somewhat cylindrical annular guide element 13. This guide element 13 has its internal bore 14 fitting tightly against piston rod 2, so that piston rod 2 is guided radially in the guide element 13, and so that no contamination can enter the seal 4 from the outside. The guide element 13 is made preferably of a thermoplastic, i.e., elastic plastic, with good sliding charactersitics with respect to steel, e.g. a polyolefin or PTFE or the like. The guide element 13 is mounted axially in the housing 1 in theoretically the same fashion as the fastening element 10. An annular recess 15 is provided on the cylindrical outer circumference of the guide element 13, the radial depth of such recess 15 being at least equal to the annular width of a snap ring 16 associated with this recess, the snap ring 16 being likewise practically free of axial play in the recess. The snap ring 16 fits into an annular groove 17 in the internal wall 7 of the housing. This annular groove 17 is differentiated from the annular groove 12 by the fact that its side wall, resting against internal chamber 8 of the housing 1, is tapered outwardly from the bottom of the annular groove in the form of a truncated cone, so that a tapered surface 18 is formed to facilitate assembly of the device.

The internal wall 7 of the housing 1 has a similar taper 19' at its edge 19, which taper expands toward such edge also to facilitate assembly. The housing 1 is not plastically deformed in the entire area of the seal or over its length, i.e., it has a cylindrical outside surface which is completely rectalinear. The guide element 13 is formed in such fashion that it covers the edge 19 of the housing 1 with a shoulder 20, so that a clean and smooth closure of the gas spring is effected at this end.

The axial spacing of fastening element 9 and guide element 13 is such that the seal 4 is compressed axially to a desired degree, so that it is pressed radially by virtue of its elastic properties with a desired preset tension, on the one hand against the internal wall 7 of the housing 1 and on the other hand with its lips 5 against piston rod 2. The seal 4 consists of an elastic material, preferably polyurethane known by the registered trademark of "Vulkollan."

Housing 1 is closed at the end opposite the seal 4 in such fashion that the edge 21 of the housing is flanged and fastened coaxially in a gas-tight manner with a threaded cap 22, so that a closure element 23 of any desired form, such as an eye or spherical-segment-shaped element can be fastened by means of an appropriate threaded cap 24. At the opposite, free end of the piston rod 2, a closure element 25 is likewise fastened. Using spherical-segment-shaped connecting elements 23, 25 ensures that no bending moments can be introduced to the housing 1 or the piston rod 2, so that leakage of the seal 4 resulting from nonuniform radial stress is excluded.

A guide piston 26 is fastened to the inner end of the piston rod 2, with the connection being provided in such fashion that the guide piston 26 can be inserted with its concentric bore 27 on a similarly concentric pin 28 riveted to and extending from the inner end of the piston rod 2. The piston is practically free of play in the radial direction but is axially displaceable with its cylindrical external circumferential surface 29 against the internal wall 7 of the housing 1. The piston 26 has one or more axial throttle bores 30, which allow a throttled gas flow from one of the housing chambers 8a or 8b to flow into the other.

On the end wall of the fastening element 9, facing the internal chamber 8, a shock absorber 31 is mounted, which prevents a hard impact of the guide piston 26 against the fastening element 9 when the piston rod 2 emerges from the housing 1 to its end position as shown in FIG. 2. This shock absorber 31 is composed of an elastically flexible material such as rubber, for example, which on the one hand has elastic properties and on the other hand has damping properties. The shock absorber is made in such fashion that it is compressible for a finite distance in the direction of housing axis 3. Advantageously, as shown in the drawing, it is in the form of a ring with a trapezoidal cross section, with the shorter of the two parallel sides facing the guide piston 26. When this shock absorber 31 is compressed, the two shoulders, as can be seen in FIG. 2 are pushed out laterally.

The outside circumferential surface 29 of the guide piston 26 has an annular groove 32 with a rectangular cross section located concentrically with respect to the axis 3. The annular groove 32 contains a snap ring 33 which is slotted circularly as shown in FIG. 3 and has a circular cross section. The annular groove 32 is deep enough to accept the snap ring 33 completely, i.e., in the sample embodiment shown the depth of annular groove 32 is at least equal to the cross sectional diameter $a$ of the snap ring 33.

In the internal wall 7 of the housing 1 there is likewise provided, concentrically with respect to axis 3, an annular recessed groove 34, whose cross section is in the shape of a segment of a circle, the circular segment having an aperture angle of no more than and preferably less than 180°. The radius of the arcuate surface is equal to or somewhat greater than the cross sectional radius $a/2$ of snap ring 33. The fact that the aperture angle of the circular segment cross section of the annular recessed groove 34 is less than 180° ensures that the snap ring 33, which is forced by its spring tension into recess 34 when the rod 3 is maximally withdrawn as shown in FIG. 2, is pushed back again into the annular groove 32 as a result of axial loading of piston rod 2 in the direction of arrow 35, so that the lock between the guide piston 26 and the housing 1 is released.

Two possible embodiments for the axial arrangement of the recess 34 in the housing 1 are as follows. The first possibility consists in arranging the recess 34 in such fashion that the snap ring 33 fits into the recess 34 when the guide piston 26 barely touches the shock absorber 31, with the piston rod 2 in its fully extended position being in a resting position, created by the equilibrium of force $P_K$ acting on piston rod 2 from outside, the force of the gas $P_G$ acting on the piston rod from the inside, and the reactive force of the compressed shock absorber $P_A$ being formed. The force of the gas $P_G$ is formed by the product of the gas pressure in chamber 8 and the cross section of piston rod 2. The force of the gas $P_G$ is greater than the force $P_K$ exerted from outside, for example by the hatchback of an automobile, on piston rod 2.

A second, more advantageous, possibility for the axial arrangement of the annular-groove shaped recess 34 consists in displacing the recess 34 somewhat further toward the seal 4 with respect to the initially suggested position. In this case, the piston 26, resting against the shock absorber 31 in its above-described resting position, is pushed toward seal 4 by exerting a force $P_V$ with additional compression of the shock absorber 31 until the snap ring 33 fits into the recess 34. In this case, a greater reaction force $P'_A$ will be exerted on the piston by shock absorber 31, so that after force $P_V$ acting on piston rod 2 is released, force $P'_V$ can act on snap ring 33 in recess 34.

The snap ring 33 is provided of a material advantageously for ensuring good sliding properties on the internal wall 7 of housing 1, made of steel, and the snap ring 33 therefore is made preferably of hard brass. If it is desired to make the depth of recess 34 equal to or greater than the radius $a/2$ of the cross section of snap ring 33, it is desirable to provide an additional tapered surface 36 in the internal wall of housing 7 which faces the internal chamber of the housing, so that trouble-free unlocking is possible.

The use of such a gas spring as a lifting device for the hatchback of an automobile is shown in FIG. 4. Here in known fashion the closure element 25 of the piston rod 2 is pivoted on a swingable hatchback 38 around a horizontal pivoting axis 37, while the other connecting element 23 of the housing 1 is attached to the body 39 of the automobile 40. The gas pressure in chamber 8 of the gas spring is sufficiently high so that after a gentle outward pivoting of hatchback 38 from the lower, closed position the gas spring lefts hatchback 38 to the upper position; after a short additional lifting of the hatchback 38 while in this upper resting position, the snap ring 33 snaps into the recess 34. By exerting a corresponding force acting from above on the rear end of hatchback 38, this lock is released and then the hatchback can be closed with correspondingly smaller force and simultaneous sliding of the piston rod 2 into the housing 1. The gas spring according to the invention can be used equally well as a lifting means for hinged doors on cabinets or for the trunk lids of automobiles or the like.

It will be obvious to those skilled in the art that various changes may be made without departing from the scope of the invention and the invention is not to be considered limited to what is shown in the drawing and described in the specification.

What is claimed:

1. In a gas spring comprising a cylindrical housing, a piston rod acting as a compressing piston mounted coaxially in said housing and protruding from one end of the housing, a guide piston at the internal end of said piston rod, a seal resting against the piston rod and fastened axially in said housing at the end of said housing at which the piston rod emerges, and elastically flexible shock absorber for said guide piston, mounted adjacent said seal, the improvement comprising:

a snap ring carried by and in an annular groove on the outside circumferential surface of said guide piston and an annular recessed groove provided in the internal wall of said housing partially and releasably accepting the said snap ring when the said guide piston is resting against said shock absorber.

2. A gas spring according to claim 1, wherein said annular recessed groove is axially displaced with respect to the position of said snap ring in the balanced end position of said guide piston by a slight distance relative to said seal with said shock absorber being compressible for at least this distance.

3. A gas spring according to claim 1, wherein said annular recessed groove has on its side facing the interior chamber of said housing, a tapered surface tapered in such fashion toward the axis of housing that when a force is exerted on said snap ring which acts in the inward-pushing direction of said piston rod, a radial force component acts on said snap ring to reduce its diameter.

4. A gas spring according to claim 1, wherein said snap ring is a split ring having a circular cross section.

5. A gas spring according to claim 4, wherein the depth of said annular recessed groove is less than half the diameter of the cross section of said snap ring.

* * * * *

UNITED STATES PATENT OFFICE
CERTIFICATE OF CORRECTION

PATENT NO. : 3,947,006
DATED : March 30, 1976
INVENTOR(S) : BAUER et al.

It is certified that error appears in the above—identified patent and that said Letters Patent are hereby corrected as shown below:

[76] Inventors: Hans-Peter Bauer, Ziegelhütte 9, 8503 Altdorf; Hans Jürgen Bauer, am Eichenhain 8, 8505 Röthenbach, both of Germany Signed and Sealed this Fourteenth Day of December 1976

[SEAL]

Attest:

RUTH C. MASON
Attesting Officer

C. MARSHALL DANN
Commissioner of Patents and Trademarks